Sept. 9, 1947.   R. E. THOMPSON ET AL   2,427,168
DRIVING GEAR UNIT
Filed June 11, 1943
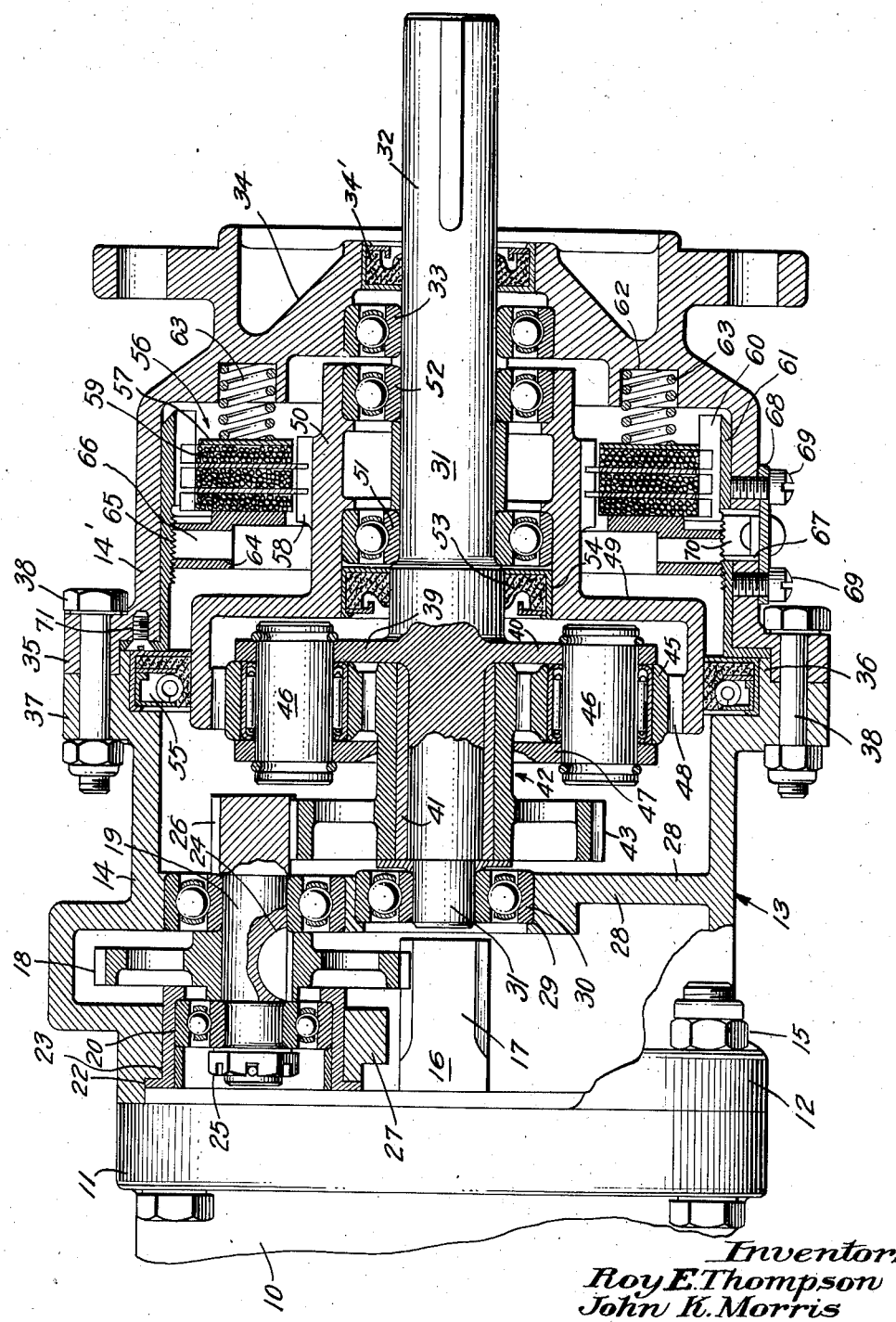
Inventors
Roy E. Thompson
John K. Morris
By James M. Abbott
Attorney.

Patented Sept. 9, 1947

2,427,168

UNITED STATES PATENT OFFICE 2,427,168

DRIVING GEAR UNIT

Roy E. Thompson, South Gate, and John K. Morris, Los Angeles, Calif.

Application June 11, 1943, Serial No. 490,532

1 Claim. (Cl. 74—291)

This invention relates to power transmission means and particularly pertains to a driving gear unit.

In connection with airplane construction and operation certain types of installations require that various individual units shall be controlled electrically and selectively operated at the unit, such for example as bomb door controls, flap operating, and landing gear mechanism. In such devices it is necessary to install individual motors adjacent to the point of application of power, and to interpose a power transmission gear unit between the motor and the device to be operated, so that a desired motive force will be created and applied. In view of the fact that such structures are applied at various points upon an airplane remote from the controls, it is desirable to provide a brake mechanism acting automatically to interrupt the driving action when a predetermined resistance to driving force occurs. It is also essential that such structures shall be light in weight and compact in design. It is the principal object of the present invention, therefore, to provide a driving unit of the character described which is compact in design, giving a large gear reduction between the driving motor and the driven element, and within which is embodied a brake mechanism releasing under overload conditions, the said unit being housed within an oil-sealed case, whereby variations in temperature and altitude will not affect the lubrication.

It is another object of the invention to provide a gear unit in which a planetary gear set and brake structure are assembled in a manner to permit unitary assembly and removal of various parts without difficulty.

The present invention contemplates the provision of a housing directly connected to an electric motor or other prime mover structure, in which housing a removable gear unit and brake may be assembled, said gear unit including a planetary gear set carried by the driven shaft.

The invention is illustrated by way of example in the accompanying drawing in which the figure is a central longitudinal view through the driving unit indicating a fragmentary portion of the prime mover with which it is assembled.

Referring more particularly to the drawing, 10 indicates a prime mover, here shown as being an electric motor. The motor is fitted with a bolting flange 11 complementary to a bolting flange 12 of a driving unit 13. The bolting flange 12 is part of the driving unit housing 14 and is secured to the motor by bolts 15. The motor is fitted with a drive shaft 16 at the end of which a gear 17 occurs. This gear is here shown as a spur pinion in mesh with a gear wheel 18. The gear wheel 18 is carried upon a shaft 19 which in turn is supported by ball-bearing structures 20 and 21. The outer raceway of the structure 20 is mounted within a cup 22 fitted within a bore 23 of the housing. The diameter of the bore 23 is sufficient to permit the outer raceway of the bearing 21 to pass therethrough to an assembled position. The gear wheel 18 is secured intermediate the two bearings by a Woodruff key 24 carried by the shaft 18. At the end of the shaft adjacent to the motor 10 is a nut 25 holding the shaft in place. At the opposite end of the shaft 19 is a gear pinion 26. This pinion may be formed integral with the shaft or mounted thereon. In any event it is large enough to form a stop for the inner race of the bearing 21. The ball-bearing 20 is mounted within a boss 27 formed within and integral with the housing 14. The bearing 21 is mounted within a transverse web 28, which extends across the housing and is formed with a bore 29 concentric with the longitudinal axis of the shaft 16. A bearing 30 is mounted within said bore and receives the upper end 31 of driven shaft 32. The driven shaft 32 is longitudinally aligned with the drive shaft 15 and extends downwardly through an anti-friction bearing 33 supported within a central boss 34 of a lower housing section 14'. A packing ring 34' seals the boss 34 around the driven shaft 32. The lower housing section 14' is fitted with a bolting flange 35 which is counterbored and receives an extension 36 of bolting flange 37 carried by the upper housing section 14. The bolting flanges are secured together by bolts 38. By this arrangement the housing may be parted on an intermediate transverse plane for purposes of assembly, as will be hereinafter described.

The driven shaft is of special construction, having a pair of diametrically opposite radial arms 39 and 40 formed integral with the shaft at a suitable point intermediate the ends thereof. A shaft portion 32' occurs on the side of the arm adjacent to the motor 10. This receives a bushing 41 upon which a composite gear unit 42 is mounted and with relation to which it may freely rotate. One end of this unit provides a gear wheel 43 in mesh with the pinion 26. The opposite end of the unit provides a sun gear 44 in mesh with a series of planet gears 45. The planet gears are mounted upon pins 46, one of which is shown as extending through a bore in radial arms 39 and 40. The opposite ends of pins 46 are supported by a bearing plate 47.

The planet gears 45 are encircled by and are in mesh with an internal ring gear 48. The ring gear 48 is carried upon a spider 49, which is formed with a hub 50. This hub is provided with bearings 51 and 52 through which the driven shaft extends. An oil-seal structure 53 is formed around the driven shaft 32 adjacent to the bearing 51. This forms an oil seal between the driven shaft 32 and bore 54 of the hub 50. An oil-seal ring 55 is secured in complementary counterbores of the housing section 14 and 14' and engages the outer face of the ring gear 48. Thus, the compartment between the spider 49 and the housing web 28 will provide a grease-tight container within which the gears 26, 43, 44, 45, and 48 run. Attention is directed to the fact that by the use of oil rings 53, 55 and 34' the entire brake structure is sealed off from the gear case. This insures that the brake will remain dry while permitting the gears to be packed in grease.

It is intended that under normal circumstances the ring gear 48 will be held against rotation. This is accomplished by an overload brake 56 which acts as rotation restraining means. The brake comprises a plurality of dry brake plates 57 splined onto keys 58 carried by the hub 50 of the web 49. Between these plates friction discs 59 occur. These are splined to keys 60 carried by a sleeve 61 mounted within the lower housing section 14'. The sleeve is secured in position when the housing sections are bolted together. The housing section 14' carries a plurality of spring cavities 62 to receive brake springs 63. These bear against the brake plates and discs. The opposite side of the brake structure is held by an adjusting ring 64. This is externally threaded to engage the thread 65 within the sleeve 61. A plurality of radial openings 66 are formed through the ring and are accessible through an opening 67 in the housing. This opening is normally closed by a plate 68 held by cap screws 69. The edge of the ring 64 is serrated to receive a lock tongue 70, which prevents rotation of the ring after it has been adjusted to impose a desired tension upon the brake elements and a desired compression of the springs 63.

In operation of the present invention the assembly of the structure will be first considered. The sleeve 61 may be placed in position with the lower brake disc 57 resting upon the springs 63, and with the adjusting ring 64 tightened into the sleeve 61. This structure rests on the shoulder of the counterbore in the bolting flange 35 of the lower housing section 14', where it is held by screws 71. The oil-seal ring 55 is seated within the counterbore of the bolting flange 37 of the housing section 14. The ring gear 48 with its spider 49 and hub 50 may then be introduced into the lower housing section 14 with the keys 58 engaging the splineways of the brake disc 57. The driven shaft 32 upon which is assembled the planetary gears 45 and their pins 46 may then be placed in position through the bearings 51 and 52 with the pinions 45 meshing with the ring gear 48. It will be understood that the shaft 19 with its gear 18 has been assembled within the housing section 14, and that when the housing section 14 is placed in assembled relation the housing section 14' with the pinion 26 in mesh with the gear 43 the entire structure will be assembled and can be held in its assembled position by the bolts 38. If desired the ring gear 48, the spider 49, and the hub 50 with the bearings 51 and 52 might be assembled as a unit with the driven shaft unit. In any event the drive will be concentric and the entire structure will be a compact symmetrical unit.

In operation the motor 10 will drive the pinion 17 and will impart rotation to the gear 18. This in turn will drive the pinion 26 and the gear 43. The gear 43 is fixed to the gear 44 and will thus impart rotation to the planetary gears 45. Under normal conditions the planetary gears are in driving relation to the ring gear 48 which is held fixed by the brake 56. Thus a predetermined rotation of the driven shaft 32 will be imparted to the radial arms 39 and 40. A driving action will continue until an overload condition exists as determined by the setting of the brake ring 64, at which time the brake will slip to allow rotation of the gear 48 and will thus prevent undue strain upon the driven shaft 32 and the parts which it drives.

It will thus be seen that the structure here disclosed is simple and compact in design, provides a desirable gear reduction, and a safety drive arrangement, which is particularly adapted as a driving unit for remotely controlled mechanism on airplanes and the like.

While we have shown the preferred form of our invention as now known to us, it will be understood that various changes may be made in combination, construction and arrangement of parts by those skilled in the art, without departing from the spirit of our invention as claimed.

Having thus described our invention, what we claim and desire to secure by Letters Patent is:

A driving unit, comprising a brake housing section and a gear housing section detachably connected along a plane normal to the longitudinal axis of the housing, a drive shaft rotatably mounted in the end of the gear housing section, a driven shaft rotatably mounted in the brake housing section and extending into the gear housing section, a sun gear freely rotatable upon the extending portion of the driven shaft, a gear train within the gear housing section imparting driving motion from the drive shaft to the sun gear, a spider carried on the driven shaft, planetary gears rotatably carried by the spider and in mesh with the sun gear, a ring gear disposed substantially at the parting line between the two housing sections, an oil seal ring disposed substantially at the parting line between the two housing sections and forming a seal between the circumference of the ring gear and the wall of the housing, a hub formed as part of the ring gear and extending longitudinally of the driven shaft within the brake housing section and being rotatably supported upon said shaft, an oil seal ring disposed between said hub and the driven shaft, a friction disc brake disposed in the brake housing structure having elements engaging the hub of the ring gear, a liner removably mounted within the brake housing section and engaging the other elements of the brake structure, a pressure ring adjustably mounted within the liner and against which one side of the brake structure bears, and yieldable means mounted within the brake housing section and bearing against the opposite side of the brake structure.

ROY E. THOMPSON.
JOHN K. MORRIS.

REFERENCES CITED

The following references are of record in the file of this patent:

UNITED STATES PATENTS

| Number    | Name     | Date          |
|-----------|----------|---------------|
| 1,702,479 | Mosch    | Feb. 19, 1929 |
| 2,222,716 | Mageoch  | Nov. 26, 1940 |
| 2,271,640 | Heintz   | Feb. 3, 1942  |
| 2,303,637 | Heintz   | Dec. 1, 1942  |
| 1,925,943 | Stein    | Sept. 5, 1933 |
| 1,843,987 | Ragan    | Feb. 9, 1932  |
| 1,860,703 | Christian | May 31, 1932 |